(12) United States Patent
Geisler et al.

(10) Patent No.: US 8,751,190 B2
(45) Date of Patent: Jun. 10, 2014

(54) METHOD FOR ASCERTAINING A ROTATIONAL DIRECTION OF A ROTATING BODY, AND WHEEL SENSOR MODULE

(75) Inventors: Dominik Geisler, Reutlingen (DE); Axel Wenzler, Rottweil (DE); Markus Brockmann, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 758 days.

(21) Appl. No.: 12/924,574

(22) Filed: Sep. 29, 2010

(65) Prior Publication Data
US 2011/0082663 A1 Apr. 7, 2011

(30) Foreign Application Priority Data
Oct. 2, 2009 (DE) .................. 10 2009 045 305

(51) Int. Cl.
*G01P 3/56* (2006.01)
*G01P 3/44* (2006.01)

(52) U.S. Cl.
USPC .......................................... 702/145

(58) Field of Classification Search
USPC .................. 702/141, 145, 147, 148
See application file for complete search history.

(56) References Cited

U.S. PATENT DOCUMENTS 7,367,227 B2 * 5/2008 Stewart et al. .................. 73/146

FOREIGN PATENT DOCUMENTS

| DE | 603 08 213 | 1/2007 |
| DE | 10 2007 046 308 | 4/2009 |
| WO | WO 2005/069993 | 8/2005 |
| WO | WO 2009/043739 | 4/2009 |

* cited by examiner

*Primary Examiner* — Manuel L Barbee
(74) *Attorney, Agent, or Firm* — Kenyon & Kenyon LLP (57) ABSTRACT

In a method for ascertaining a rotational direction of a rotating body, one rotational direction and one rotational speed value which indicates the rotational frequency of the rotating body are ascertained in each of multiple measurements. The rotational speed values of the multiple measurements are compared to each other, and a rotational direction of the rotating body is ascertained from the measured rotational directions and the comparison of the rotational speed values.

11 Claims, 4 Drawing Sheets

METHOD FOR ASCERTAINING A ROTATIONAL DIRECTION OF A ROTATING BODY, AND WHEEL SENSOR MODULE

BACKGROUND OF THE INVENTION

1. Field of the Invention

The present invention relates to a method for verifying, or checking the plausibility of, a rotational direction of a rotating body, e.g., a vehicle wheel or of a shaft.

2. Description of the Related Art

The utilization of acceleration sensors is known for ascertaining the rotational direction and/or rotational speed of rotating or turning systems. In particular, wheel sensor modules which detect different measured variables are utilized in vehicle wheels, for example the tire air pressure, a temperature and the accelerations themselves, and communicate these measured variables or part of these measured variables via a transmitting device to a receiver on the vehicle body. In some cases it is provided that the wheel sensor modules themselves do not receive any data with locating information, and also that no data are sent by the vehicle in such a way that their position on the vehicle is recognizable from the receiving characteristics of the electronics. The position on the vehicle is also not known by programming the wheel electronics. Hence it is provided in such systems that the wheel sensor module itself ascertains the rotational direction, and that it may be established from the rotational direction whether the vehicle wheel is located on the left or right side of the vehicle.

It is known from published German patent application document DE 10 2007 046 308 A1 to place acceleration sensors on the vehicle in a tangential direction with a 90° phase shift, so that the acceleration sensors each convey the product of the gravitational acceleration and the sine function or cosine function of an angle which determines the rotational position of the vehicle wheel. It is thus possible to deduce the rotational direction depending on whether the phase shift during the rotational motion is positive or negative; a vernier method is employed to evaluate the ascertained phase differences. Moreover, in addition to the rotational direction, the rotational speed or rotational frequency of the vehicle wheel is also ascertained.

Such direct determination of the rotational direction from ascertained phase differences and assignment of the phase differences to a sine and cosine function or two phase-shifted sine functions is not always clear, however, not even after deducting the offsets of the signals. This is the case in particular if the measuring signals deviate from a pure sine or cosine, for example due to a rough subgrade or a change in the vehicle velocity. It has been found that with multiple measurements and corresponding evaluations, by assigning the phase difference to a rotational direction, sometimes contradictory results may arise in ascertaining the rotational direction.

Placing two sensor devices on the wheel with a 90° phase shift makes it possible to obtain pure tangential acceleration measurements without a contribution of the centrifugal acceleration; but this is very complicated and costly. When acceleration sensors with other detection directions are used, a radial acceleration component must be taken into account, which is determined in particular by the centrifugal force when the vehicle wheel is turning. The centrifugal portion of the acceleration values can be calculated by deducting a mean value or determining a linear or polynomial fit from the source data.

Published German document DE 603 08 213 T2 shows a device for determining the position of a vehicle wheel, which is usable in particular with a tire pressure sensor module. The device has two acceleration sensors, whose detection directions each have a component in the vertical plane with an angular offset of 0° and 180°. With this system too, the phase shift between the measured acceleration signals is ascertained and from it the rotational direction of the vehicle wheel is determined, from which the wheel can be located on the vehicle.

Published international patent application document WO 2005/069993 A2 describes a tire sensor module for vehicle wheels that has a pair of motion sensors from whose measuring signals a position of the vehicle tire is ascertained, wireless signals being emitted to a receiving device on the vehicle.

BRIEF SUMMARY OF THE INVENTION

According to the present invention, the rotational direction and a rotational speed value are first ascertained in multiple measurements, and subsequently these measurements are compared to each other, the ascertained rotational speed values also being compared to each other. A resulting rotational direction is subsequently ascertained on the basis of this comparison. This ascertainment according to the present invention may be in particular a verification or a plausibility check, i.e., a check of a previously ascertained rotational direction.

According to the present invention, a rotational speed value is understood as a physical variable which represents the rotational frequency or rotational speed or the angular velocity of the body; this may be in particular the rotational frequency f or the angular velocity or circular frequency $\omega = 2\pi f$.

Thus a verification of the rotational direction is possible from multiple measurements, where not only the particular rotational directions themselves ascertained in the measurements, but also the rotational speeds ascertained at the same time are used. According to the present invention, this makes greater precision and thus reliability possible. The transmission of erroneously ascertained data may be completely or largely prevented. If it is found that a previous measurement or some previous measurements were already correct, since it was possible to verify the ascertained rotational directions, according to the present invention a repetition of the measurements may be dispensed with.

Along with the ascertained rotational direction, it is possible in addition to communicate the ascertained rotational frequency and/or the reliability of the correctness of the result estimated during the plausibility check.

According to the present invention, the rotational directions and rotational frequencies may be determined from the multiple measured values using a vernier function, e.g., according to published German patent application document DE 10 2007 046 308 A1, where ascertaining the rotational frequencies is already part of the process of ascertaining the rotational direction. Since the measured values of the rotational frequencies are thus already known, little additional effort is required according to the present invention.

According to the present invention, in principle any rotating body may be analyzed; in particular, a vehicle wheel or a shaft may be checked.

The sensor module according to the present invention has an acceleration sensor device for measuring acceleration values in various detection directions and/or various positions on the rotatable body; in particular it may be a wheel sensor module for a vehicle wheel, which may be provided for example on the wheel rim, in particular in the area of the valve; in principle, positioning in the tread of a tire is also possible. The acceleration sensor device may be formed, for example, by a biaxial sensor system or by two acceleration sensors placed at an angle, for example with one sensor in the tangential direction or running direction of the tire and the other sensor in a different direction, for example a radial direction, so that there is a phase shift of 90° or some other angle and the measured components of the gravitational acceleration may be depicted as the sine and cosine of a phase angle of the gravitation, with the centrifugal acceleration needing to be calculated out. In addition, it is also possible, for example, to use two tangential acceleration sensors spaced at a distance in the circumferential direction.

According to one example embodiment of the present invention, it is possible to take multiple measurements within a sufficiently short time period, so that it may be assumed that a vehicle velocity will not change suddenly, and that the rotational frequencies of the wheels thus must be correspondingly similar and the rotational direction remains unchanged. Thus it is possible by appropriately comparing the multiple measurements to sort out erroneous ascertainments and use only the correct measurements. In so doing, the check may be performed in particular by comparing the rotational speed values of the multiple measurements, for example using methods of statistical analysis. In this case, for example, evaluations of the measurements are possible using valuation points or weighting figures, or else a discretization of the relevant frequency spectrum of the measurements and evaluation of the discretized frequencies. In this case the chosen weighting function may be selected or variously parameterized for example, depending on the estimated velocity or signal quality.

According to another example embodiment, a relationship between the radial acceleration to be ascertained and the ascertained circular frequency or rotational frequency of the wheel may be ascertained from previous measurements. In this case, for example, a proportionality factor of the relationship between the radial acceleration and the square of the circular frequency or rotational frequency may be ascertained, which may thus be used for verifying further measurements.

According to the present invention, during the analysis measurements with positive and negative rotational direction may be evaluated separately from each other, or else may be treated equally.

The sensor module according to the present invention, in particular a wheel sensor module, may be independent and Merely communicate data to a receiving device, for example on a body of a vehicle. As the sensors it is possible to use AMR (anisotropic magnet resistance) or GMR (giant magneto resistance) sensors, as well as Hall sensors and optical or micromechanical sensors. The wheel sensor module may for example measure a tire air pressure and/or a temperature, and output these values together with the ascertained values of the rotational speed and/or rotational frequency as a wireless signal.

Also provided, according to the present invention, is a computer program that has computer-executable instructions for carrying out the method according to the present invention on a computer. Furthermore, a computer program product having a program code for executing the method is provided, if the program is executed on a computer or control unit.

DETAILED DESCRIPTION OF THE INVENTION

Figure 1:
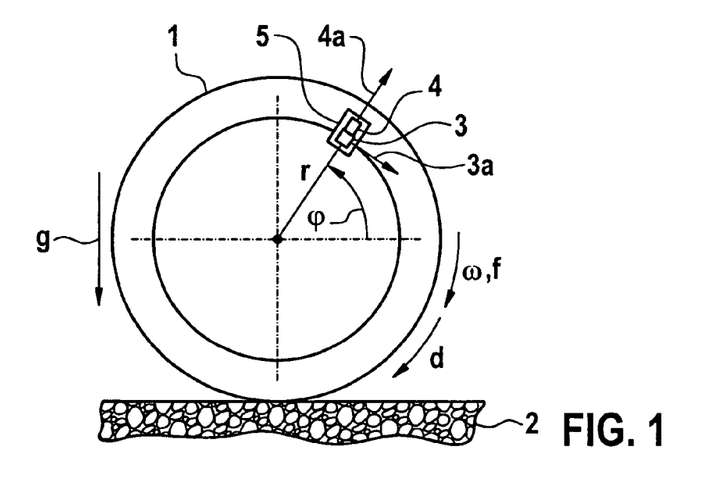
FIG. 1 shows a representation of a vehicle wheel having two acceleration sensors.
Figure 8:
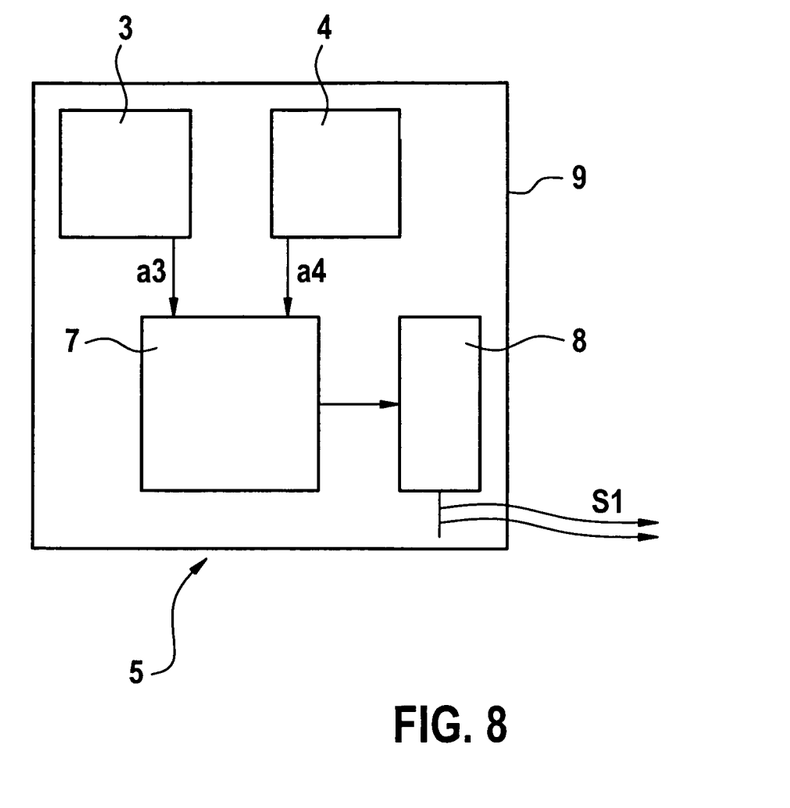
FIG. 8 shows a block diagram of the sensor module.

FIG. 1 shows a schematic view of a vehicle wheel 1 which is rolling on a subgrade 2. On or in vehicle wheel 1 a wheel sensor module 5 is provided which has two acceleration sensors 3, 4 spaced at a distance r from the wheel center point, and according to the schematic layout of FIG. 8 a control device 7, a transmitting device 8 for transmitting wireless signals S1, and a sensor housing 9. A detection direction 3a of first acceleration sensor 3 runs in the tangential direction, a detection direction 4a of second acceleration sensor 4 runs in the radial direction. Acceleration sensors 3, 4 may be placed, for example, on a wheel rim, for example at the valve of vehicle wheel 1. First acceleration sensor 3 measures an acceleration a3 which is made up of a component of gravitational acceleration g and if applicable an acceleration in the circumferential direction, i.e., a change over time of the magnitude of the travel velocity $v=r*\omega$, where $\omega=d\phi/dt$ is the speed of rotation (angular velocity). Here first acceleration sensor 3 measures a value $g*\cos \phi$ as a component of the gravitational acceleration g, with $\phi$ as a plotted phase angle of the circular position relative to the horizontal; the dynamic contribution $r*d\omega/dt$ due to the change in rotational speed is slight, and may be ascertained later if necessary from the knowledge of the various values ascertained for $\omega$ or from the change in the centrifugal acceleration.

Second acceleration sensor 4 measures an acceleration a4, which is made up of the centrifugal acceleration $az=r*\omega^2$ and the gravitational component $g*\sin(-\phi)$.

The gravitational components ascertained from the two measuring signals a3 and a4 thus form functions of the form $\cos \phi$ and $\sin(-\phi)$, i.e., corresponding to $\sin \phi$ and $\cos \phi$, so that they have a phase shift of 90° or $\pi/2$ or some other value. Alternatively to FIG. 1, a system according to published German patent application document DE 10 2007 046 308 A1 may also be used, i.e., having two acceleration sensors placed in or on vehicle wheel 1 offset by 90° in the circumferential direction and each oriented in the tangential direction; no relevant centrifugal acceleration occurs in a system of this sort, but two separate sensors are necessary.

According to the present invention, multiple measurements are initially taken for various phase angles $\phi i$, where i=1, 2, ..., $\phi$ being calculated from the signals $x=\cos \phi$ and $y=\sin \phi$ using an arc tangent function or an approximation of that function. Corresponding, for example, to the method described in published German patent application document DE 10 2007 046 308 A1, it is possible to ascertain the rotational direction di and the rotational speed $\omega i$ on the basis of the angle information; this may be done in particular using a vernier method. However, the frequency and phase information could also be ascertained, for example, using a Fourier transformation or a fast Fourier transformation. The rotational frequency and direction may also be ascertained and checked for plausibility using the described method.

Figure 2:
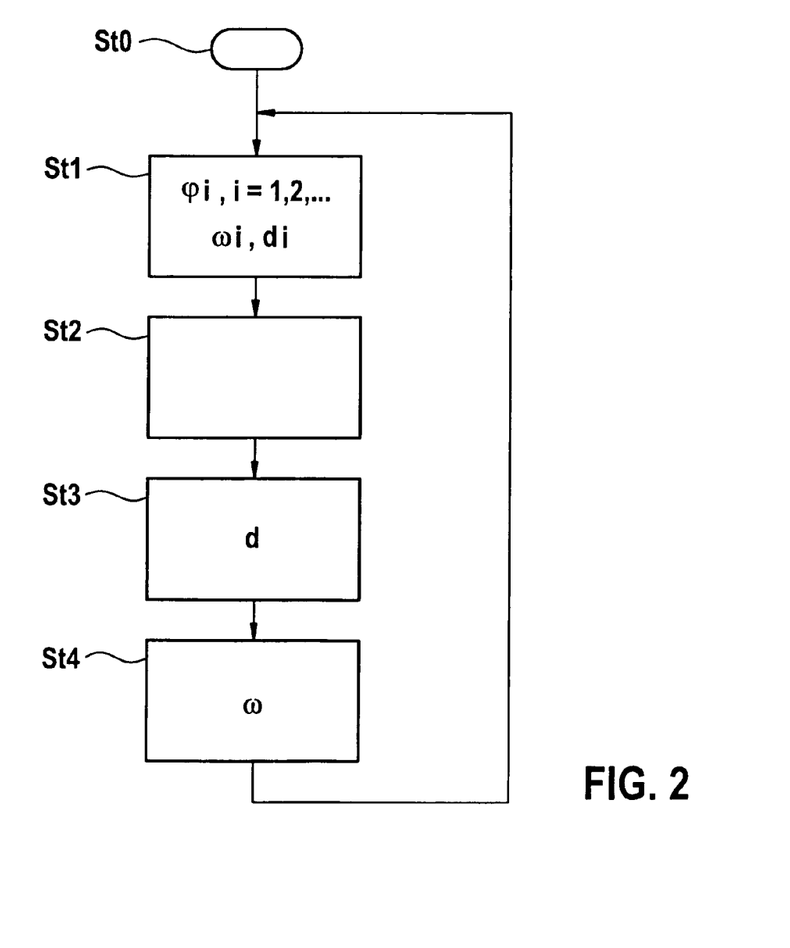
FIG. 2 shows a flow diagram of a method according to the present invention.

FIG. 2 first reproduces in general a flow diagram of an example method according to the present invention, which may be carried out in principle entirely in sensor module 5, i.e., in particular in control device 7. The method is started in step St0, for example upon detection of a rotational motion of vehicle wheel 1 by acceleration sensors 3, 4, which causes sensor module 5 to be switched from a standby mode to the computing mode. Next, in step St1 multiple measurements are taken in sequence, i.e., measurements are carried out for various phase values $\phi i$, i=1, 2, 3 . . . with the aid of acceleration sensors 3, 4, and furthermore values are ascertained for rotational speed $\omega i$ and rotational direction di from the measured values, for example according to the method described in DE 10 2007 046 308 A1. In principle, examining rotational speed (circular frequency, angular velocity) $\omega i$ or rotational speed or rotational frequency $fi=\omega i/(2\pi)$ is equivalent; according to the present invention, other rotational speed variables which are clearly related to f or $\omega$ may also be considered.

Next, in step St2 verification procedures and/or evaluation procedures according to alternative specific embodiments are carried out, various examples of which are shown below according to FIGS. 4 through 7, which may be inserted into the block of step St2.

Next, in step St3 rotational direction d is ascertained according to the present invention, in particular through plausibility checking.

Furthermore, according to step St4, in addition to ascertaining the rotational direction p, rotational speed $\omega$ may also be recalculated, as is performed according to the examples below. The method may then be set back to before step St1, so that it may be carried out continuously according to the loop in FIG. 2.

In step St2, rotational speeds $\omega i$ and rotational speeds $fi=\omega i/(2\pi)$ of multiple measurements are compared to each other, and then in step St3, the ascertained rotational direction d is determined or checked for plausibility as a function of this comparison. Thus according to the present invention not only rotational directions di ascertained in step St1 for the sequential measurements are used, but also the values $\omega i$ for the rotational speeds or the rotational frequencies fi.

Figure 3:
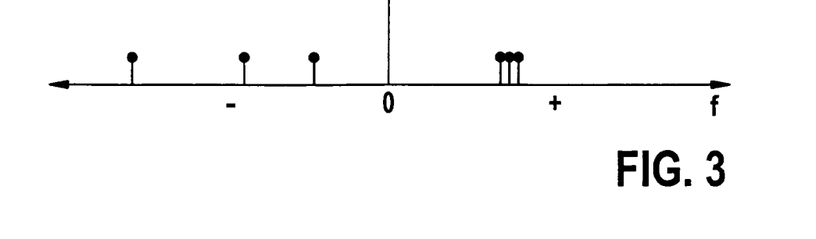
FIG. 3 shows the representation of the direction and frequency of rotation of multiple measurements in a diagram.

FIG. 3 shows the distribution of six measurements of fi, di, i.e., i=1, . . . N=6 measurements, where rotational frequency f is plotted on the horizontal axis and indicates to the right a positive value, i.e., a positive rotational direction, and correspondingly to the left a negative rotational direction.

Thus negative rotational directions were ascertained from three measurements, at large relative intervals from each other, and three measurements in a positive rotational direction, whose ascertained rotational frequencies are close to each other. While it would not be possible to draw any conclusions about the rotational direction for example solely on the basis of the method ascertained in DE 10 2007 046 308 A1, since equal numbers of measurements indicate the positive and the negative rotational direction, according to the present invention the rotational frequency f is also considered. Here it may be recognized that in the positive rotational direction three measurements with well-matching rotational frequency were ascertained, so that the positive rotational direction may be verified by also using rotational frequency f, whereas the measurements in the negative rotational direction may be verified as false due to clearly differing rotational frequencies f.

According to a first method, rotational direction di and rotational frequency fi are each ascertained multiple times at short intervals or within a sufficiently short time one after the other.

A completely new set of measuring data may be used for these various calculations, but there may also be an overlap in the use of the measuring data, i.e., some of the recorded acceleration values are reused for a new frequency calculation.

This is based on the consideration according to the present invention that in general the travel velocity of the vehicle and hence rotational frequency fi will not change suddenly, and hence rotational frequencies fi ascertained in a sufficiently short time period will be similar. False calculations may thus be sorted out by comparing the measuring results in a sufficiently short time period. The relevant time period for this may be greater than rotation time $T=1/f=1/(2\pi\omega)$ of vehicle wheel 1; for example, it may be several seconds. It is recognized according to the present invention that the vehicle has a relatively great mass, and that rotational speed f of the wheels depends first and foremost on the travel velocity, if there is no slippage or blocking of the wheels.

In the event of a control intervention on vehicle wheels 1, for example by a brake regulation or a traction control system, this first method may result in erroneous conclusions. In principle this is not serious, however, since then such a false conclusion is reached in both directions, i.e., to the left and right in FIG. 3, so that it is recognized that it is not possible to ascertain the rotational direction due to the present driving situation or tire contact situation, and the rotational direction is ascertained again only later when a sufficiently stable driving state is reached.

According to the present invention, various implementations of this example embodiment are possible in order to assess the values of the rotational frequency or its distribution. Two different implementation examples will be explained below, illustrating steps St2 or St2 and St3 in FIG. 2.

IMPLEMENTATION EXAMPLE 1

Figure 4:
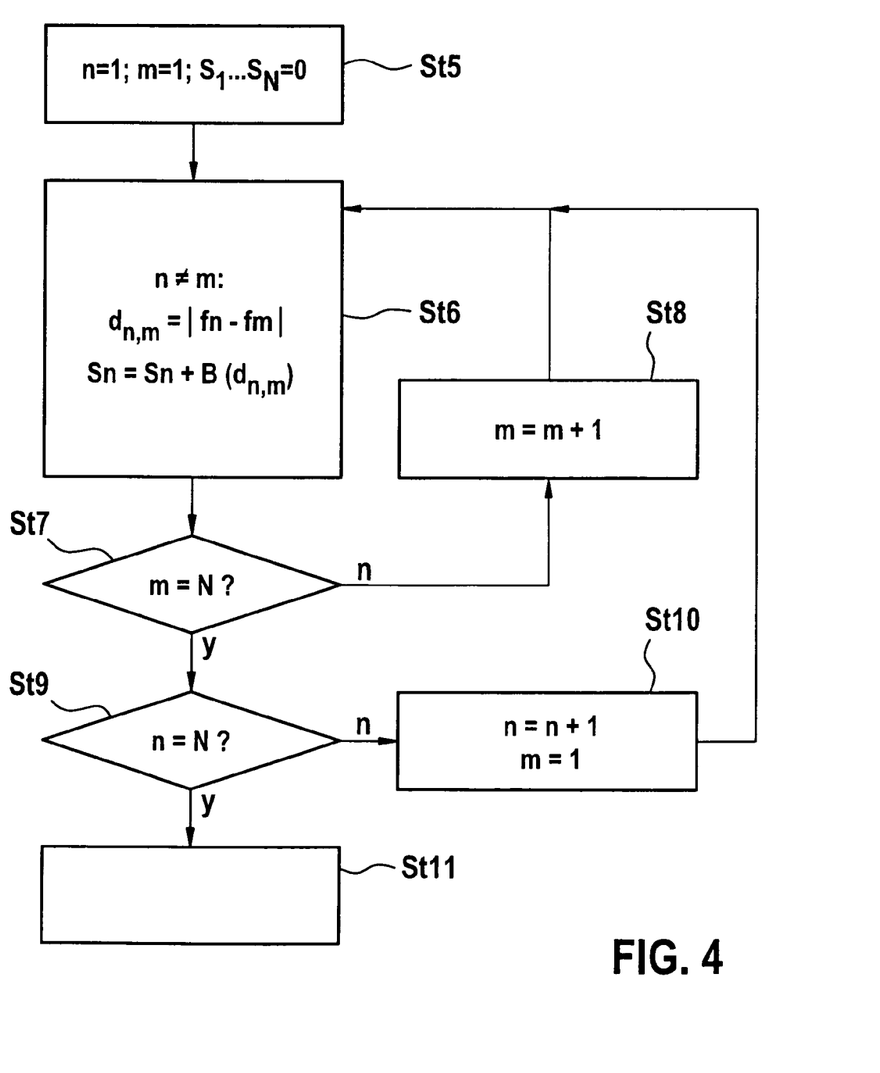
FIG. 4 shows a flow diagram of a method usable in FIG. 2 according to one example embodiment.

The best of the measured rotational frequencies fi is ascertained. This may be done in particular through statistical analysis or weighting. According to the example shown in FIG. 4, it is possible in particular for each ascertained frequency $fn=\omega n/(2\pi)$ to determine the magnitude $d_{n,m}$ of the difference from the other m calculated frequencies of the other measuring points. Each distance or difference $d_{n,m}$ is advantageously evaluated with rating points on the basis of a rating function $B(d_{n,m})$. For example, a difference $d_{n,m}<1$ Hz may be evaluated with three rating points, a difference $d_{n,m}<2$ Hz with two rating points and a difference $>2$ Hz with 0 rating points. For each frequency fn, the sum Sn of all rating points of the differences from the other frequencies is ascertained, i.e.

$$Sn = \sum_m B(d_{nm})$$

Then rotational frequency fn having the highest sum Sn is ascertained. On the basis of the height of Sn, it is possible in addition to estimate the probability of whether this frequency is actually correct; furthermore, a minimum value for Sn may be established, so that Sn must reach or exceed this minimum value in order to be regarded as a significant measurement, enabling a state of blocking or slippage to be ruled out.

A possible erroneous conclusion regarding the rotational direction and/or the rotational frequency due to severely impaired measuring data because of a rough subgrade may also be recognized.

FIG. 4 shows such an implementation as a loop with parameters n and m, with step St5 following step St1 from FIG. 2. For all values of fn, where n=1, . . . N, with N=6 in FIG. 3, in step St5 parameters n and m are set to 1 and sums Sn are made equal. Next, step St6 may optionally be executed, checking whether n≠m, and in that case the difference $d_{n,m}=|fn-fm|$ is calculated and then the value of rating function B is ascertained, and sum Sn is increased by this rating value $B(d_{n,m})$. In principle this step St6 may also be dispensed with, however. Decision steps St7, St8 with the branches y for yes and n for no, together with the increments St9, St10 form the complete loop, so that it is possible subsequently in step St11 to ascertain rotational frequency fn with the highest sum Sn, this highest value Sn also representing the reliability of the result.

IMPLEMENTATION EXAMPLE 2

Figure 5:
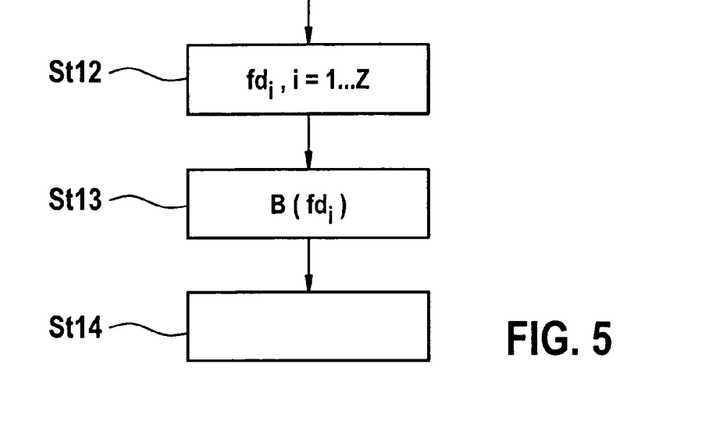
FIG. 5 shows a flow diagram of a method usable in FIG. 2 according to another example embodiment.

This implementation according to FIG. 5 is similar in principle to the first implementation example of FIG. 4; however the calculated frequencies are not rated with points, but rather in step St12 the entire relevant frequency spectrum is discretized, i.e., broken down into discrete frequency ranges $fd_i$ for i=1 to Z. Next, in step St13 all discretized frequencies $fd_i$ are rated with rating points of at least one rating function $B(fd_i)$, which may correspond for example to the function described above in reference to FIG. 4 or may have a different weighting. Then in step St14 the discretized frequency $fd_i$ whose sum Si has the highest value is ascertained to be the best. Thus with this implementation example, contrary to the first implementation example described above, it is also possible to ascertain as the best frequency a frequency $fd_i$ that was not calculated in one of the measurements.

Figure 6:
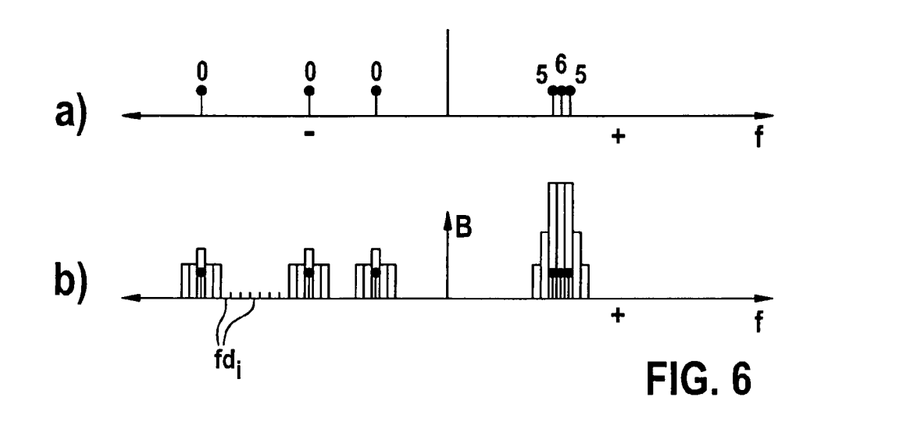
FIG. 6 shows a representation corresponding to FIG. 3 with an evaluation according to the present invention, according to a) FIG. 4 and b) FIG. 5.

FIG. 6 shows the first implementation example of FIG. 4 in the upper diagram a and the second implementation example of FIG. 5 in the lower diagram b. According to the representation in diagram a of FIG. 6, the measurements shown in FIG. 3 are rated with rating points of rating function B; the widely separated frequencies with negative rotational direction receive the total point number 0 here. The three measurements in the positive rotational direction receive high total point numbers, namely S=5, 6 and 5. The middle one of these three measurements receives the highest total number of points here, and is thus the favorable frequency. Thus on the one hand the positive rotational direction is confirmed, and in addition the middle measurement in the positive rotational direction is ascertained to be the best rotational frequency ascertained.

According to diagram b of FIG. 6, some discretized frequencies $fd_i$ are plotted as examples. Those discretized frequencies $fd_i$ which are further distant from the ascertained frequency values of the measurements receive the total point number 0 and are thus not shown any further. In the case of the three measuring values of the negative rotational direction, the discretized frequencies $fd_i$ in which there is a single measuring value have for example the total point number S=2; the respective adjacent or next but one discretized frequencies, $fd_{i+1}$ and $fd_{i+2}$ receive a total point number of S=1 for example. In the positive rotational direction—depending on the weighting of the rating function—each of the three discretized frequencies $fd_i$ in which there is one measuring value for example receives the total point number S=5; the adjacent discretized frequencies $fd_n$ receive correspondingly less.

Figure 7:
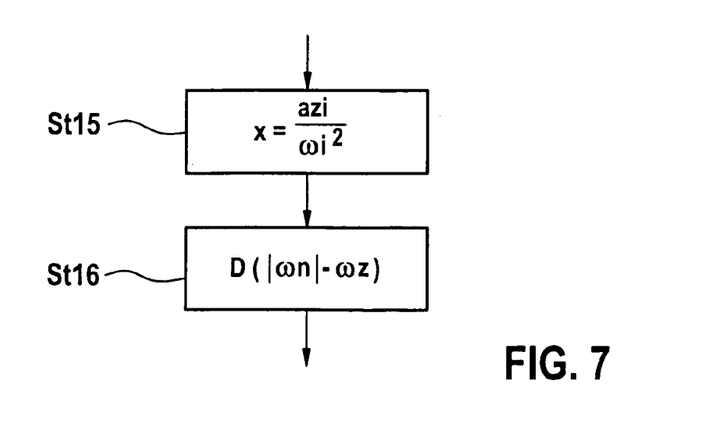
FIG. 7 shows a flow diagram of a method usable in FIG. 2 according to another example embodiment.

According to a second example embodiment schematically shown in FIG. 7, the ascertained acceleration values may be rated quantitatively on the basis of previous measurements. It is possible here in particular to ascertain the value of centrifugal acceleration az, which depends on the circular frequency $\omega=2\pi f$ and a proportionality factor x according to the formula $az=x\,\omega^2$. Measuring signal a4 of second acceleration sensor 4 is made up here of centrifugal acceleration az and the above-mentioned gravitational component $g^*\sin(-\phi)$, which is no longer significant at higher rotational frequencies. According to the present invention, the two components of the ascertained radial acceleration measuring value a4 may be ascertained and corrected iteratively. Proportionality factor x is dependent here on radial distance r, i.e., for example the diameter of the wheel rim, and the exact positioning of the radial acceleration sensor on the wheel rim, i.e., in particular on the angle of its direction of measurement in relation to the radial direction. Hence the proportionality factor may lie only within certain limits and be ascertained in the sensor module itself, by comparing the ascertained rotational frequency f or circular frequency ω and centrifugal acceleration az of multiple measurements (azi, i=1, 2, . . . ) to each other.

Hence according to this second example embodiment, proportionality factor x is initially ascertained in step St15; from multiple measurements in this first ascertainment it is possible to use for example the first specific embodiment, described in reference to FIGS. 4 through 6.

Future measurements relating to the rotational direction and rotational frequency may be verified subsequently in step St16. To this end, the corresponding rotational frequency ωz may initially be ascertained from a measured centrifugal acceleration az according to the formula $$\omega z = (az/x)^{1/2}$$

Then it is possible to check whether a difference between the calculated value ωz and the magnitude |ωn| of value ωn ascertained according to method 1 described above is sufficiently small. To this end, a rating function D may be introduced advantageously, which rates the distance, i.e., the difference, between ωz and |ωn|. This rating function D may successively modify or manipulate the resulting value Si, for example by addition or multiplication.

This calculation and rating may thus also be included in the overall rating. Thus sum Sn described earlier may be modified accordingly. With sum Sn (e.g., n=4, i.e., S4) prior to the current verification, the result according to a configuration for S(n+1) (hence e.g., S5) may then be:

$$S5 = S4 * D(|w\_n| - w\_z) \text{ in a multiplicative correction.}$$

In this case, according to the present invention an amount is calculated prior to the rating, since the algebraic sign is not ascertained from the centrifugal acceleration itself.

A possible rating function D may check, for example, whether the difference lies within acceptable tolerance limits, for example D(x)=1 for –delta_w<x<delta_w, und D(x)=0 for other values of x.

In the case of the second example embodiment it is advantageous here that in the method described in published German patent application document DE 10 2007 046 308 A1, when the rotational direction is ascertained erroneously, rotational frequency f or circular frequency ω is typically also ascertained erroneously. Thus when rotational frequency f is verified, it is possible in turn to conclude that the rotational direction is correct. Hence faulty measurements may be recognized immediately on the basis of the very precisely measurable centrifugal acceleration and may be rejected if necessary. In particular, in the method described in published German patent document DE 10 2007 046 308 A1, because of the non-linear property, in the event of a faulty measurement, the error is in rotational frequency f so that the plausibility check according to the second specific embodiment is simplified.

What is claimed is:

1. A method for ascertaining a rotational direction of a rotating body, comprising:
    measuring, by a processor, in each of multiple measurements, one rotational direction and one rotational speed value indicating the rotational frequency of the rotating body;
    comparing, by the processor, the rotational speed values of the multiple measurements to each other; and
    ascertaining, by the processor, the rotational direction of the rotating body based on the measured rotational directions and the comparison of the rotational speed values;
    wherein in each of the measurements, at least two acceleration sensors each measure a gravitational acceleration with a phase shift, and the rotational speed value and the rotational direction as ascertained from the values measured by the two acceleration sensors;
    wherein for multiple measurements recorded within a specified time period, intervals of the rotational speed values relative to each other are evaluated, and the rotational direction of the rotating body is ascertained based on the evaluation; and
    wherein in the evaluation of the intervals of the rotational speed values relative to each other, a most significant rotational speed value is ascertained, and the rotational direction assigned to the most significant rotational speed value is determined as the rotational direction of the rotating body.

2. The method as recited in claim 1, further comprising:
    comparing the measured rotational directions to each other; and
    ascertaining an overall rotational speed value of the rotating body based on the comparison of the rotational speed values of the multiple measurements.

3. The method as recited in claim 1, wherein the ascertainment of the most significant rotational speed value is carried out using a rating function which assigns rating values to the intervals.

4. The method as recited in claim 3, wherein the rating function assigns rating values to each of the intervals of the rotational speed values, and for each ascertained rotational speed value a sum of the rating values of the intervals is formed, and based on the sum the most significant rotational speed value is ascertained.

5. The method as recited in claim 4, wherein the rating values are allocated to the intervals as a function of the size of the intervals.

6. The method as recited in claim 4, wherein a frequency range within which the rotational speed values of the ascertained measurements lie is subdivided into discretized rotational speed values, and the discretized rotational speed values are assessed as a function of distance from the ascertained rotational speed values of the measurements.

7. The method as recited in claim 1, wherein, for a first set of measurements, a centrifugal acceleration is ascertained from the values measured by the two acceleration sensors, and wherein a relationship between the ascertained centrifugal acceleration and rotational speed values is ascertained from the first set of measurements, and wherein subsequent measurements are compared to the ascertained relationship to determine whether the subsequent measurements are erroneous.

8. A method for ascertaining a rotational direction of a rotating body, comprising:
    measuring, by a processor, in each of multiple measurements, one rotational direction and one rotational speed value indicating the rotational frequency of the rotating body;
    comparing, by the processor, the rotational speed values of the multiple measurements to each other; and
    ascertaining, by the processor, the rotational direction of the rotating body based on the measured rotational directions and the comparison of the rotational speed values;
    wherein in each of the measurements, at least two acceleration sensors each measure a gravitational acceleration with a phase shift, and the rotational speed value and the rotational direction are ascertained from the values measured by the two acceleration sensors;
    wherein, for a first set of measurements, a centrifugal acceleration is ascertained from the values measured by the two acceleration sensors, and wherein a relationship between the ascertained centrifugal acceleration and rotational speed values is ascertained from the first set of measurements, and wherein subsequent measurements are compared to the ascertained relationship to determine whether the subsequent measurements are erroneous; and
    wherein a proportionality factor is ascertained from the centrifugal acceleration and rotational speed values of the first set of measurements, and wherein the proportionality factor is used to determine whether the subsequent measurements are erroneous.

9. The method as recited in claim 8, further comprising:
    comparing the measured rotational directions to each other; and
    ascertaining an overall rotational speed value of the rotating body based on the comparison of the rotational speed values of the multiple measurements.

10. The method as recited in claim 8, wherein, for a first set of measurements, a centrifugal acceleration is ascertained from the values measured by the two acceleration sensors, and wherein a relationship between the ascertained centrifugal acceleration and rotational speed values is ascertained from the first set of measurements, and wherein subsequent measurements are compared to the ascertained relationship to determine whether the subsequent measurements are erroneous.

11. A non-transitory computer-readable storage medium storing a computer program having codes which, when executed on a computer, perform a method for ascertaining a rotational direction of a rotating body, the method comprising:
    measuring, in each of multiple measurements, one rotational direction and one rotational speed value indicating the rotational frequency of the rotating body;
    comparing the rotational speed values of the multiple measurements to each other; and
    ascertaining the rotational direction of the rotating body based on the measured rotational directions and the comparison of the rotational speed values;
    wherein in each of the measurements, at least two acceleration sensors each measure a gravitational acceleration with a phase shift, and the rotational speed value and the rotational direction as ascertained from the values measured by the two acceleration sensors;

wherein for multiple measurements recorded within a specified time period, intervals of the rotational speed values relative to each other are evaluated, and the rotational direction of the rotating body is ascertained based on the evaluation; and wherein in the evaluation of the intervals of the rotational speed values relative to each other, a most significant rotational speed value is ascertained, and the rotational direction assigned to the most significant rotational speed value is determined as the rotational direction of the rotating body.

* * * * *